(12) United States Patent
Oh et al.

(10) Patent No.: US 7,056,612 B2
(45) Date of Patent: Jun. 6, 2006

(54) METHOD OF PREPARING MEMBRANE-ELECTRODE-GASKET ASSEMBLIES FOR POLYMER ELECTROLYTE FUEL CELLS

(75) Inventors: In-Whan Oh, Seoul (KR); Heung Yong Ha, Seoul (KR); Seong-Ahn Hong, Seoul (KR); Sang-Yeoul Ahn, Seoul (KR); Yong-Chul Lee, Seoul (KR); Tae Won Lim, Seoul (KR); Ki Chun Lee, Kyungki-do (KR); Soo Whan Kim, Kyungki-do (KR); Jong Hyun Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 397 days.

(21) Appl. No.: 10/329,242

(22) Filed: Dec. 23, 2002

(65) Prior Publication Data

US 2003/0121603 A1 Jul. 3, 2003

(30) Foreign Application Priority Data

Dec. 27, 2001 (KR) ............................ 2001-0085826

(51) Int. Cl.
*H01M 8/10* (2006.01)
*H01M 2/14* (2006.01)
*H01M 4/88* (2006.01)
(52) U.S. Cl. ............................ 429/30; 429/40; 429/42; 429/35; 429/36
(58) Field of Classification Search ................ 429/30, 429/34–36, 38, 40–44
See application file for complete search history.

(56) References Cited

U.S. PATENT DOCUMENTS 5,211,984 A 5/1993 Wilson (Continued)

FOREIGN PATENT DOCUMENTS

JP 07220742 A * 8/1995

OTHER PUBLICATIONS

M.S. Wilson and S. Gottesfeld, Thin-Film Catalyst Layers for Polymer Electrolyte Fuel Cell Electrodes, Journal of Applied Electrochemistry, Jan. 1992, pp. 1-7, vol. 22, No. 1, North-Holland.

(Continued)

*Primary Examiner*—Tracy Dove
(74) *Attorney, Agent, or Firm*—Morgan Lewis & Bockius LLP

(57) ABSTRACT

A manufacturing method of Membrane-Electrode-Gasket Assemblies (MEGAs) used for polymer electrolyte fuel cells (PEFCs) is described wherein a polymer electrolyte membrane is formed directly on a electrode. A typical PEFC is constructed by assembling membrane-electrode assembly (MEA), gaskets, and separators. According to the invented method, PEFC is fabricated by assembling separators and MEGA, into which MEA and a gasket are integrated. Compared to the conventional MEA-gasket assemblies, MEGAs are easy to handle and can be mass-produced via a manufacturing process in a series. Moreover, employing MEGAs improves PEFC performance since the membrane thickness of MEGAs is lower than that of the conventional MEA-gasket assemblies.

11 Claims, 3 Drawing Sheets

U.S. PATENT DOCUMENTS

| | | |
|---|---|---|
| 5,234,777 A | 8/1993 | Wilson |
| 5,561,000 A | 10/1996 | Dirven et al. |
| 5,629,104 A | 5/1997 | Crawford, Sr. et al. |
| 5,868,912 A * | 2/1999 | Reichert et al. ............ 204/252 |
| 6,207,310 B1 * | 3/2001 | Wilson et al. ................ 429/26 |
| 6,709,781 B1 * | 3/2004 | Suzuki et al. ................ 429/34 |
| 6,861,171 B1 * | 3/2005 | Suzuki ........................ 429/34 |
| 6,864,004 B1 * | 3/2005 | Wilson et al. ................ 429/32 |

OTHER PUBLICATIONS

R. Mosdale and P. Stevens, New Electrodes for Hydrogen/Oxygen Solid Polymer Electrolyte Fuel Cell, Solid State Ionics, May 1993, pp. 251-255, vol. 61, No. 1-3, Chapman & Hall.

* cited by examiner

US 7,056,612 B2

METHOD OF PREPARING MEMBRANE-ELECTRODE-GASKET ASSEMBLIES FOR POLYMER ELECTROLYTE FUEL CELLS

FIELD OF INVENTION

The present invention is concerned with a method of manufacturing Membrane-Electrode-Gasket Assemblies (MEGAs), in which a Membrane-Electrode-Assembly (MEA) and a gasket are integrated, used for polymer electrolyte fuel cells (PEFCs). The invention also relates to a method of forming a very thin polymer electrolyte membrane sandwiched between two electrodes.

DESCRIPTION OF THE PRIOR ART

Polymer electrolyte fuel cell (PEFC) is an energy conversion device which converts chemical energy into electrical energy by the electrochemical reactions of hydrogen-containing fuels, for example hydrogen or methanol, and oxygen-containing gases, for example oxygen. PEFCs are often subclassified into Solid Polymer Electrolyte Fuel Cell (SPEFC) and Direct Methanol Fuel Cell (DMFC). Performance of PEFCs primarily depends the characteristics of MEAs, which in turn depends on a variety of physical characteristics of the MEAs and, in a related sense, also on the manufacturing process.

Various methods of manufacturing MEAs for PEFCs have been developed. M. S. Wilson et al., in Journal of applied electrochemistry, 22 1 (1992)], described a process of fabricating MEAs, by a so-called "decal" process. The catalyst ink was prepared by mixing carbon supported Pt catalyst, Nafion™ solution (Du Pont Co.), and glycerol and then sprayed (by casting or painting) on polytetrafluoroethylene (PTFE) films. A Nafion™ membrane was provided and the two catalyst-sprayed PTFE films were each placed respectively on both side of the membrane, after which they were hot-pressed. Then, the PTFE films were removed from the hot-pressed body, leaving catalyst layers comprising Pt and Nafion™ on both sides of the Nafion membrane. Finally, the MEA was completed by attaching porous carbon papers to the catalyst layers. See M. S. Wilson and S. Gpttesfeld, Journal of applied electrochemistry, 22 1 (1992), and also U.S. Pat. No. 6,207,310, Fuel cell with metal screen flow-field; U.S. Pat. No. 5,629,104, Modular electrical energy device; U.S. Pat. No. 5,234,777, Membrane catalyst layer for fuel cells; and U.S. Pat. No. 5,211,984, Membrane catalyst layer for fuel cells, the disclosures of which are incorporated herein by reference thereto.

R. Mosdale et al. prepared MEAs by spraying catalyst ink prepared by mixing carbon supported Pt catalyst, ethanol, Nafion solution, PTFE suspension, and acetylene directly onto both sides of Nafion membrane, and then attaching porous carbon papers to both sides of the catalyst-sprayed Nafion membrane. See R. Mosdale and P. Stevens, Solid State Ionics, 61 251 (1993), the disclosure of which is incorporated herein by reference thereto.

P. Driven et al. manufactured MEAs by spraying dehydrated carbon powders on dehydrated porous carbon papers to form an intermediate layer, spraying catalyst ink consisting of catalyst powders and an ionomer on the intermediate layers to make an anode or a cathode, and then hot pressing the electrodes and a electrolyte membrane at a temperature higher than $T_g$ (glass-transition temperature of the electrolyte) with applying a constant pressure. See P. Driven and W. Engelen, U.S. Pat. No. 5,561,000 (1996) the disclosure of which is incorporated herein by reference thereto.

The inventors have discovered several problems with these prior art MEAs. To construct PEFCs using MEAs prepared by the above-mentioned methods, gaskets are inserted between MEAs and separators to obtain gas tightness, which makes manufacturing process of the fuel cells complicated and adds an additional step wherein the extensively pre-fabricated subassembly can be damaged. Additionally, the relatively low ionic conductivity of the Nafion membrane is one of the major sources to reduce the cell efficiency. Finally, the fabrication processes described therein are cumbersome and not readily amenable to mass production.

SUMMARY OF THE INVENTION

Objectives of the present invention therefore include developing a manufacturing method of MEGAs for PEFCs in an integrated body, which allows mass production of the cell components in a series of continuous processes, and to improve PEFC performance.

A typical PEFC is constructed by assembling separate components including membrane-electrode assembly (MEA), gaskets, and separators. According to the invented method, PEFC is fabricated by assembling separators and MEGA, into which MEA and at least one gasket are integrated. Compared to the conventional MEA-gasket assemblies, MEGAs are easier to handle, easier to install, and can be more readily mass-produced via a manufacturing process in a series. Moreover, employing MEGAs improves PEFC performance since the manufacturing process allows the membrane thickness of MEGAs to be lower than that of the conventional MEA-gasket assemblies.

DETAILED DESCRIPTION OF THE INVENTION

Figure 1:
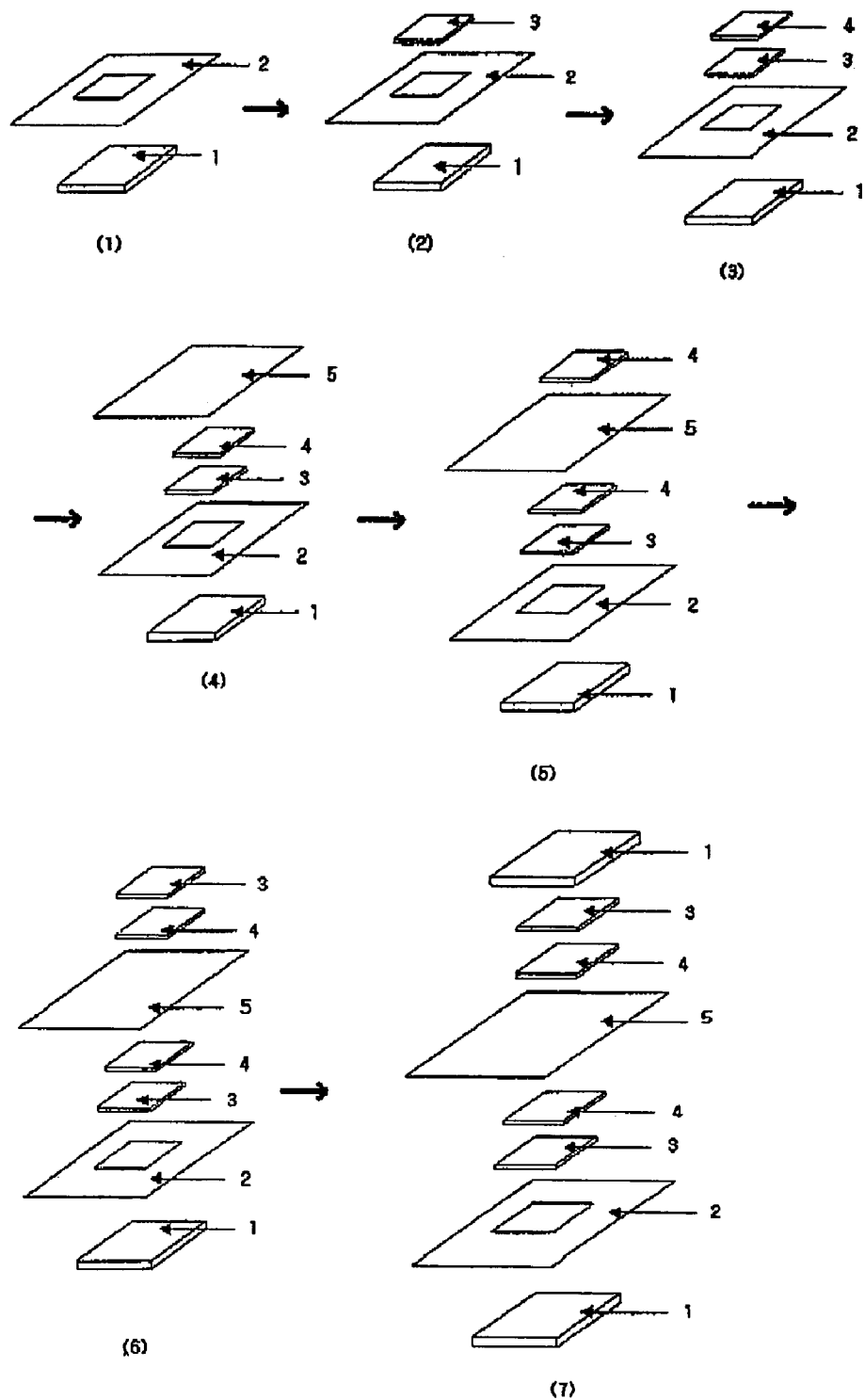
FIG. 1, with subparts (1) to (7), shows a schematic of the manufacturing process of Membrane-Electrode-Gasket Assemblies (MEGAs) according to the present invention.

The present invention is concerned with a manufacturing method of MEGAs used for polymer electrolyte fuel cells. In the FIGS. 1 and 2, the various subassemblies are labeled as follows: 1 is a gas diffusion layer, 2 is a gasket, 3 is a carbon powder layer, 4 is a catalyst layer, 5 is an electrolyte layer, and 6 is an electrode.

The invented process is as follows:
(a) attaching polytetrafluoroethylene (PTFE) gasket (2) of about 30 to about 400 μm in thickness to a gas diffusion layer (1);
(b) spraying carbon powders mixed with about 10 to about 60 wt % PTFE, represented by (3), on the gas diffusion layer (1) coming out of the gasket (2);
(c) spraying catalyst ink containing catalyst powders, a polymer electrolyte ionomer, and an organic solvent, onto the carbon powder layer (3) to form a (typically) cathode catalyst layer (4);

(d) spraying polymer electrolyte ionomer solution on the catalytic layer (4) to form a electrolyte layer (5);

(e) spraying catalyst ink containing catalyst powders, a polymer electrolyte ionomer, and an organic solvent on the electrolyte layer (5) to make a (typically) anode catalyst layer (4);

(f) spraying the carbon powder mixed with 10~60 wt % of PTFE (3) on the anode catalyst layer (4) of step (e); and (g) attaching a gas diffusion layer (1) to the carbon powder layer (3) of step (f).

Gaskets may alternatively or additionally be placed either on the gas diffusion layer (1) of the cathode side, and/or on the electrolyte layer (5) formed on the cathode electrode.

By using the above-described method, MEGAs for Direct Methanol Fuel Cell (DMFC) as well as Solid Polymer Electrolyte Fuel Cell (SPEFC) can be prepared. The present invention is described in more detail as follows.

In polymer electrolyte fuel cells, an anode and a cathode are placed each on respective sides of hydrogen ion-conductive polymer membrane. In prior art methods, the anode and the cathode were manufactured independently by spraying catalyst ink prepared by mixing Pt or Pt/Ru catalyst powders and a polymer electrolyte ionomer (Nafion solution) on hydrated carbon papers. Then, to make up MEAs, the prepared electrodes and a polymer membrane are joined through hot pressing. The prepared MEAs are assembled with gaskets and gas flow channels to construct polymer electrolyte fuel cells.

On the other hand, when MEGAs manufactured by the invented method are employed, polymer electrolyte fuel cells are constructed by sequentially assembling MEGAs and gas flow channels since a polymer membrane, electrodes, and gaskets are integrated in MEA.

A more detailed manufacturing process of MEGAs for polymer electrolyte fuel cells is described in detail based on FIG. 1 below. To summarize the process, a PTFE gasket of 30~400 μm in thickness is attached to a gas diffusion layer ((1) in FIG. 1). On the gas diffusion layer showing up through the gasket, carbon powders mixed with 10~60 wt % PTFE is sprayed ((2) in FIG. 1). Then, catalyst ink containing carbon supported Pt catalyst powders, a polymer electrolyte ionomer, and an organic solvent is sprayed on the carbon powder layer to form a cathode catalyst layer ((3) in FIG. 1). On the catalyst layer, polymer electrolyte ionomer solution is sprayed to form an electrolyte membrane ((4) in FIG. 1). To make an anode catalyst layer, catalyst ink prepared by mixing catalyst powders, a polymer electrolyte ionomer, and an organic solvent is sprayed on the electrolyte layer ((5) in FIG. 1). Then, carbon powders mixed with 10~60 wt % of PTFE is sprayed again on the anode catalyst layer ((6) in FIG. 1). Finally, the gas diffusion layer is attached to the carbon powder layer ((7) in FIG. 1). Each step of the above-mentioned process is explained in detail hereinafter.

PTFE gasket (30~400 μm in thickness) with an adhesive on its one side is attached to the margin of a carbon paper, which is the gas diffusion layer for cathode. To increase the adhesive strength between the carbon paper and the gasket, the carbon paper-gasket assembly is advantageously hot pressed at 140° C. for a time sufficient to ensure good sealing of the adhesive, typically about 5 to about 20 minutes under a pressure of about 20 to about 200 atm using a heated compressor.

To prevent catalyst particles from penetrating into the carbon paper, a barrier layer of dehydrated carbon powder layer is formed on the carbon paper gas diffusion layer by spraying carbon slurry. The carbon slurry is prepared by mixing carbon black (for example Vulcan XC-72R™ of a particle size of about 30 nm available from Cabot Co.), dehydrating fluorocarbon, i.e., Teflon, solution (for example E-TEK), and thickeners (for example glycerin, butyl cellulose, ethylene glycol, 1-methoxy-2 propanol, and the like) to increase viscosity. The Teflon content in the carbon slurry is controlled to be between about 10 to about 60 wt % to obtain appropriate physical properties. The particle size and the surface area of the carbon powder are between about 20 to about 100 nm, and between about 20 to about 300 $m^2/g$, respectively, which brings a large electrochemical active surface area. The carbon slurry is sprayed onto the gas diffusion layer by any know means, for example by a screen-printing or a tape-casting method. Advantageously the carbon slurry loading amount is between about 0.2 to about 4.0 $mg/cm^2$. In one embodiment, only the area of the gas diffusion layer that is exposed within the gasket need be sprayed.

Then, the carbon paper-gasket assembly is advantageously pressed under a pressure of 20~200 atm by a compressor to increase the adhesive strength between the carbon powder layer and the carbon paper and to control pore size and thickness of the same. The carbon powder layer formed by the above-mentioned method immediately removes product water during operation of fuel cells due to capillarity and hydrophobic property of Teflon, resulting in prevention of flooding which interrupts the reactions at the electrodes. The efficiency and speed by which this layer removes water therefore increases the cell efficiency.

To form the cathode, catalyst ink is prepared and sprayed on the carbon powder layer. The catalyst ink is a mixture of catalyst powders (for example Pt or Pt/Ru, preferably carbon-supported Pt or Pt/Ru), polymer electrolyte ionomer (for example Nafion) solution, and an organic solvent. The catalyst ink may optionally, but need not, include a binder as disclosed in U.S. Pat. No. 5,234,777, for example PTFE.

For SPEFCs, between about 0.1 to about 1.0 $mg/cm^2$ of carbon supported Pt, or between about 0.1 to about 5.0 $mg/cm^2$ of carbon supported Pt/Ru, is loaded for anode. For cathodes of SPEFC, between about 0.1 to about 1.0 $mg/cm^2$ of carbon supported Pt is loaded on the carbon power layer. For DMFCs, between about 2.0 to about 10.0 $mg/cm^2$ of carbon supported Pt/Ru and between about 2.0 to about 10.0 $mg/cm^2$ of carbon supported Pt are loaded for anode and cathode, respectively.

The selection of the organic solvent can alter the properties of the MEGA. The catalyst powders and ionomer can be dispersed in for example isopropanol solvent. However, instead of isoproponal, other organic solvents with a hydrophilic feature are preferred as a solvent. Organic solvents with dielectric constant of 3 to 10, such as n-butyl acetate and diethyl oxalate, can be used instead of isopropanol. In organic solvents with a hydrophilic feature the catalyst ink forms macro-particles due to increased cohesion between catalyst particles and ionomers, and also therefore desirably prevents catalyst pores from blocking. Pore blocking results from penetration of ionomer into the catalyst pores, and this decreases fuel cell efficiency.

As stated, however, polymer electrolyte ionomer (for example Nafion) solution is advantageously included in the cathode. To transport hydrogen ion formed at anode toward cathode through electrolyte membrane efficiently, the electrodes and the electrolyte membrane should be well contacted. For this reason, it is required that the catalyst layer itself include ionomer, in one embodiment between about 20 to about 100 wt % of the total amount of the catalyst, to enlarge and ensure the contact area between the catalyst layer and the electrolyte membrane. However, if the ionomer content in the catalyst layer exceeds 100 wt % of the total amount of the catalyst, the cell efficiency decreases.

Among the various methods of spraying the prepared catalyst ink on the carbon powder layer to form the catalyst layer, a spray-coating method and a screen-printing method using a screen of 50~200 meshes is desirable. Optionally, a small loading of electrolyte polymer, i.e., Nafion, in solvent may be sprayed over the catalyst layer.

After spraying catalyst ink/Nafion solution for excellent contact between the electrode and the electrolyte membrane, the hydrogen ion-conductive polymer membrane is placed on the catalyst layer. Advantageously, in a preferred embodiment the hydrogen ion-conductive polymer membrane is formed on the catalyst layer, and the membrane thickness is carefully controlled, by applying the hydrogen ion-conductive polymer membrane as a solution, using for example a spray-coating method or a tape-casting method. The tape-casting method using a solution comprising between about 5% to about 40 wt % of Nafion is desirable.

The electrolyte layer formed by tape-casting the ionomer, i.e., Nafion, solution on the cathode catalyst layer increases the cell efficiency since the electrolyte layer can be made as a thin membrane, especially when compared to thicker membranes in the prior art that were separately prepared and then hot-pressed between the anode and cathode. In prior art methods, the prepared electrodes and the polymer membrane are joined through hot pressing. In U.S. Pat. No. 5,211,984, a "Nafion 117" membrane that was 7 mils thick (about 180,000 nm thick) is described. In U.S. Pat. No. 6,207,310, a "Nafion 112 membrane is described. Nafion 112 membranes are 0.05 mm, or about 51,000 nm, thick. Nafion membranes are commercially sold as thin as about 0.025 mm, or about 25,000 nm thick.

In one embodiment of the present invention, the formed hydrogen ion-conductive polymer membrane thickness is less than about 10,000 nm. In another embodiment the formed hydrogen ion-conductive polymer membrane thickness is less than about 5,000 nm. In yet another embodiment the formed hydrogen ion-conductive polymer membrane thickness is less than about 1,000 nm. In these embodiments the formed hydrogen ion-conductive polymer membrane thickness is at least about 150 nm. In yet another embodiment the formed hydrogen ion-conductive polymer membrane thickness is less than about 500 nm, for example between about 100 nm and about 250 nm. In one embodiment the formed hydrogen ion-conductive polymer membrane thickness is about 150 nm.

On the other hand, the tape-casting of Nafion solution can possibly decrease the fuel cell efficiency due to penetration of Nafion solution into the pores of the electrode catalyst layers. To avoid the phenomena, in this invention, the electrode is heated to about 45° C. to about 65° C. during the tape-casting. In one embodiment the membrane is then dried up for about 2 to about 20 min at room temperature positioned such that the catalyst layer is facedown below the electrolyte layer. Forming Nafion electrolyte layer following this process prevents Nafion solution from penetrating into pores of the electrodes. In another embodiment, the membrane may be then dried while positioned such that the catalyst layer is above the electrolyte layer.

Advantageously, the Nafion layer is then ripened at a temperature below the $T_g$ to form a hydrogen ion-conductive polymer membrane. After tape-casting or ripening the Nafion at temperatures below $T_g$, the physical properties of the Nafion layer can be improved by boiling it in pure water, or optionally in an acid-water bath.

The ion-conductive electrolyte membrane can be formed in a thinner membrane by using the tape-casting method compared to the conventional membrane, resulting in increase of the hydrogen ionic conductivity and also in a decrease of the amount of water required to be supplied from an outside humidifier. As a result, this improvement can not only increase efficiency of fuel cells but also be profitable in operation cost.

Then, PTFE gasket, advantageously with thickness of over 30 μm, and with adhesive on one side, is in one embodiment attached to the margin of Nafion membrane, i.e., the polymer electrolyte layer formed as mentioned above. The process can be omitted if the gasket is attached to the carbon paper, i.e., said gas diffusion layer of cathode. That means that the gasket can be attached to either the carbon paper or to the margin of the Nafion electrolyte layer on the cathode.

Meanwhile, there are two methods of completing the MEGA after the above process.

First, as shown in FIG. 1, the catalyst ink prepared as mentioned above is sprayed directly on the electrolyte layer, and then the carbon powder prepared by above-mentioned method is sprayed by the above-mentioned method on the catalyst layer to form the carbon powder layer. The MEGA is prepared by attaching the carbon paper or the carbon cloth to the carbon powder layer.

Figure 2:
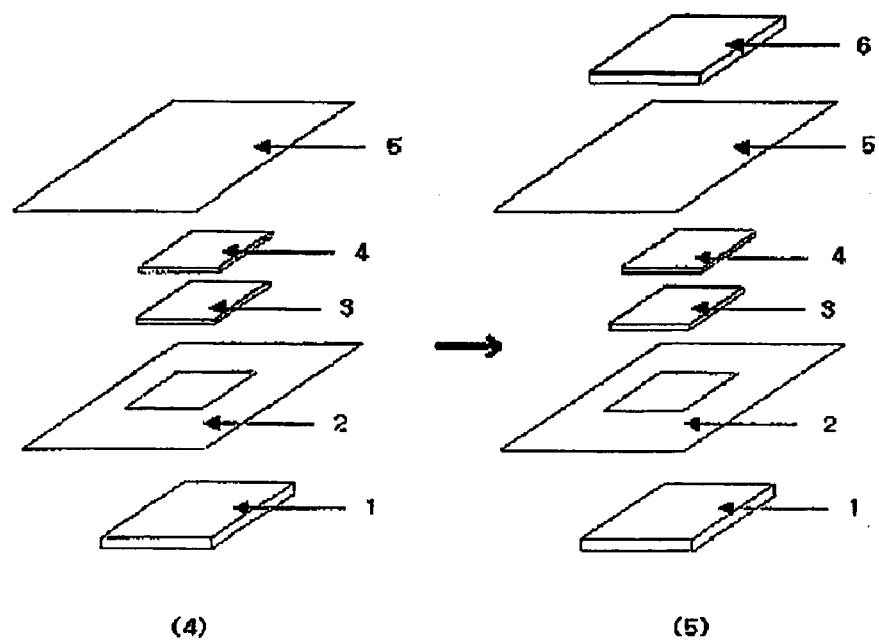
FIG. 2 presents a schematic of the manufacturing process of modified MEGAs according to the present invention.

Second, as shown in FIG. 2, a functional MEGA is prepared by attaching the anode, which is prepared independently by forming a carbon powder layer and an anode electrode layer on a carbon paper by the above-mentioned method, to the electrolyte layer.

The present invention, upon necessity, can further comprise a step of drying, advantageously at a temperature of about 60 to about 100° C., before coating a polymer electrolyte ionomer on the cathode catalyst layer.

The present invention is explained in greater detail by using the following examples. However, they should not be considered as a limiting scope of the present invention.

EXAMPLE 1

PTFE gasket of 35 μm in thickness with an adhesive on its one side (like an adhesive tape) was attached to the margin of a carbon paper, i.e., the gas diffusion layer. The carbon paper-gasket assembly was hot pressed using a heat compressor at temperatures between room temperature and 140° C. for 5 min under a pressure of 200 atm to secure the gasket to the carbon paper.

A Teflon/Carbon slurry was prepared by dispersing 10 g of micro-carbon powder (Vulcan XC-72R) in 200 g of isopropanol and 60 wt % of teflon solution (10 g), and stirring, adding 100 g of glycerol to, and stirring the slurry. To control the viscosity, the slurry was evaporated and dried at 60 to about 90° C. to adjust the concentration. The carbon layer was formed by a tape-casting method on the carbon paper (20 wt % of teflon content) with the prepared slurry using a doctor blade. The carbon content, or loading, was 2 mg/cm$^2$ based on the electrode area. The carbon paper with the carbon layer was dried in a 70° C. oven for 1 hour.

Catalyst ink was prepared by dispersing 0.1 g of Pt/C catalyst as 20 wt % carbon supported Pt in 50 g of isopropanol, adding slowly 0.17 g of 5 wt % Nafion solution to the ink, and stirring it. The electrode was prepared by spraying the catalyst ink on the carbon layer by a spray-coating method using an air brush gun, to form a catalyst layer, drying the carbon paper coated with the catalyst layer in a 70° C. oven for 1 hour, and then spraying a solution prepared by mixing 0.5 g of Nafion solution and 1.5 g of isopropanol on the surface of the catalyst layer. Pt content in the electrode with gasket was 0.7 mg/cm$^2$.

The hydrogen ion-conductive membrane was prepared using 20% wt of Nafion solution. To prevent Nafion solution from penetrating into pores of the electrode catalyst layers, 20 wt % Nafion solution was tape-cast on the cathode which was heated at 65° C. after being sprayed. Thickness of Nafion layer was 150 μm.

The next catalyst layer was prepared by directly coating Nafion layer with the catalyst ink following the above-mentioned method until the content of Pt reached 0.4 mg/cm$^2$. Then, the carbon powder layer was sprayed on the catalyst layer. Finally, the MEGA was finished by attaching a carbon cloth to the carbon powder layer.

Figure 3:
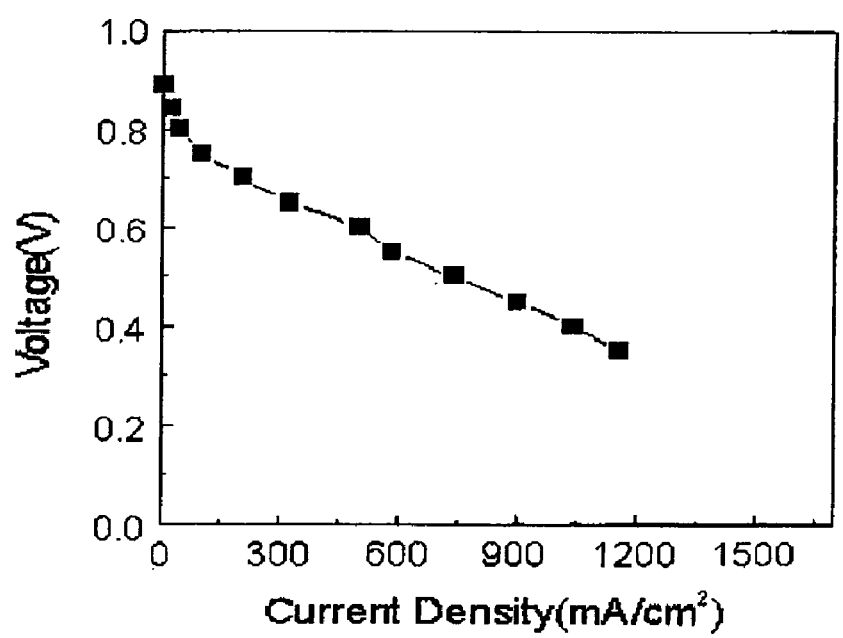
FIG. 3 exhibits performance of a single cell fabricated using MEGA manufactured as described in Example 1.

Performance of MEGAs was measured at an operating temperature of 80° C. under a pressure of 1 atm using hydrogen and oxygen as reactant gases. The result is shown in FIG. 3. As shown in FIG. 3, the MEGA made in Example 1 exhibited an excellent cell efficiency.

EXAMPLE 2

A MEGA having anode and cathode with 0.4 mg/cm$^2$ and 0.7 mg/cm$^2$ of Pt, respectively, were prepared by the same method as mentioned in Example 1. To prevent Nafion solution from penetrating into pores of the electrode catalyst layer during the formation of Nafion layer on the electrode, 20 wt % of Nafion solution was tape-cast on an inert polymer film using a doctor blade and dried up for 5 min. Then the prepared electrode (0.7 mg/cm$^2$) was put on the Nafion solution and left at room temperature for drying. After formation of Nafion layer on the cathode, Teflon gasket was attached to the margin of Nafion membrane by the same method as in Example 1. MEGA was prepared by attaching the anode to the Nafion membrane.

Figure 4:
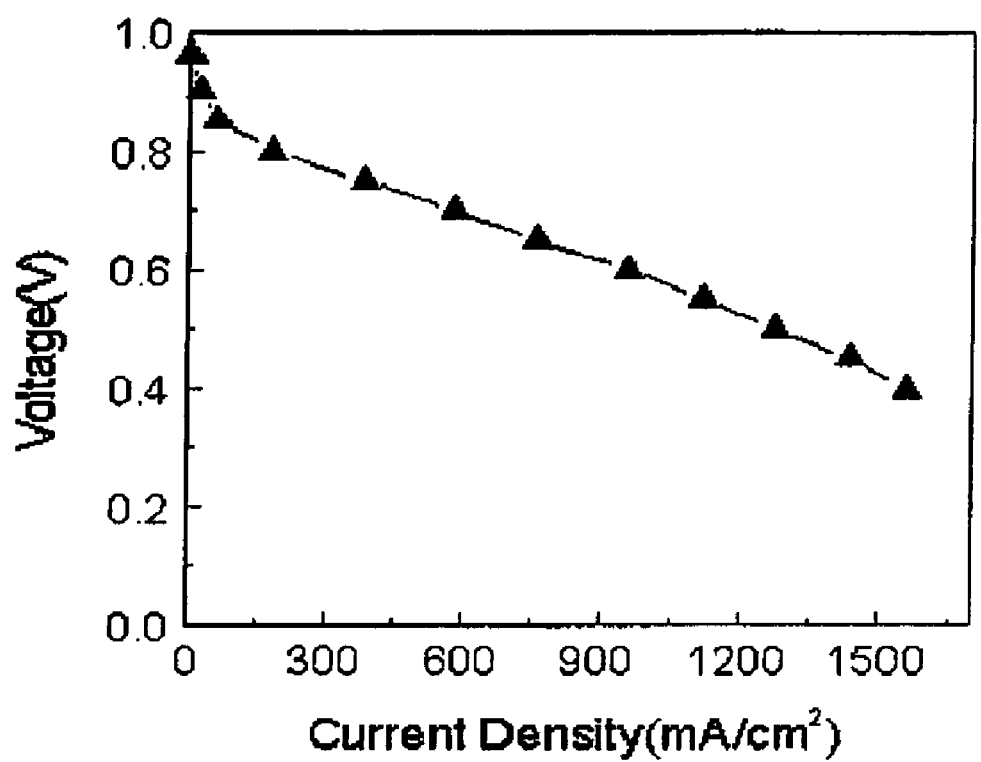
FIG. 4 shows performance of a single cell fabricated using MEGA assembled as described in Example 2.

The efficiency of the MEGA was measured at an operating temperature of 80° C. under a pressure of 1 atm using hydrogen and oxygen as reactant gases, and the result is shown in FIG. 4. As shown in FIG. 4, MEGA in Example 2 exhibited a good cell efficiency.

Therefore, membrane-electrode assembly (MEA) unified with a gasket according to the present invention is facile to treat and advantageous to mass production since it is possible to manufacture MEGAs in a series of continuous process. Manufacturing the membrane by the tape-casting make it possible to reduce the membrane thickness compared to the conventional membrane, resulting in an improved cell performance. Thus, using Membrane-Electrode-Gasket Assembly (MEGA) for SPEFCs and DMFCs improves fuel cell efficiency.

What is claimed is:

1. A method of preparing Membrane-Electrode-Gasket Assembly used for polymer electrolyte fuel cells comprising the steps of:
   (a) attaching a polytetrafluoroethylene gasket of 30 to about 400 μm in thickness to a portion of a first gas diffusion layer;
   (b) forming a first carbon powder layer by spraying a first carbon powder comprising about 10 to about 60 wt % of PTFE on the first gas diffusion layer in (a) except the portion wherein said gasket is attached;
   (c) forming a cathode catalyst layer by spraying a catalyst ink comprising catalyst powders, a polymer electrolyte ionomer, and an organic solvent on the first carbon powder layer in (b);
   (d) forming an electrolyte layer by spraying a polymer electrolyte ionomer solution on the cathode catalyst layer in (c);
   (e) forming an anode catalyst layer by spraying a catalyst ink comprising catalyst powders, a polymer electrolyte ionomer, and an organic solvent on the electrolyte layer in (d);
   (f) forming a second carbon powder layer by spraying a second carbon powder including about 10 to about 60 wt % of PTFE on the anode catalyst layer in (e); and
   (g) attaching a second gas diffusion layer to the carbon powder layer in (f).

2. The method of preparing Membrane-Electrode-Gasket Assembly used for polymer electrolyte fuel cells according to claim 1, wherein PTFE gasket of said (a) is attached by hot pressing at a temperature of between room temperature and 140° C. for about 5 to about 20 minutes under a pressure of about 20 to about 200 atm.

3. The method of preparing Membrane-Electrode-Gasket Assembly used for fuel cells according to claim 1, wherein said carbon powders of said (b) and said (f) have particle sizes and surface areas of about 20 to about 100 nm and about 20 to about 300 m$^2$/g, respectively, and wherein 0.2 to about 4.0 mg/cm$^2$ of said first and second carbon powders, based on areas of the cathode and anode catalyst layers, respectively, is sprayed on said first gas diffusion layer and said anode catalyst layer, respectively.

4. The method of preparing Membrane-Electrode-Gasket Assembly used for polymer electrolyte fuel cells according to claim 1, wherein the catalyst of said (c) and (e) is carbon supported Pt catalyst.

5. The method of preparing Membrane-Electrode-Gasket Assembly used for polymer electrolyte fuel cells according to claim 4, wherein the Membrane-Electrode-Gasket Assembly is adapted for use in a Solid Polymer Electrolyte Fuel Cell, and wherein said carbon supported Pt catalyst for the preparation of Solid Polymer Electrolyte Fuel Cell has a content of 0.1 to about 1.0 mg/cm$^2$.

6. The method of preparing Membrane-Electrode-Gasket Assembly used for polymer electrolyte fuel cells according to claim 4, wherein the Membrane-Electrode-Gasket Assembly is adapted for use in a Direct Methanol Fuel Cell, and wherein said carbon supported Pt catalyst for the preparation of Direct Methanol Fuel Cell has a content of 2.0 to about 10.0 mg/cm$^2$.

7. The method of preparing Membrane-Electrode-Gasket Assembly used for fuel cells according to claim 1, wherein the ionomers of said (c) and (e) have contents of 20 to about 100 wt % based on the total amount of the catalyst and 0.1 to about 1.5 mg/cm$^2$ based on the areas of the cathode catalyst layer and the anode catalyst layer, respectively.

8. The method of preparing Membrane-Electrode-Gasket Assembly used for fuel cells according to claim 1, wherein the polymer electrolyte ionomer solution of said (d) is sprayed on the cathode catalyst layer to directly form a membrane.

9. The method of preparing Membrane-Electrode-Gasket Assembly used for fuel cells according to claim 1, wherein the polymer electrolyte ionomer solution of said (d) is 5~40 wt % of perfluorosulfonic acid polymer solution.

10. The method of preparing Membrane-Electrode-Gasket Assembly used for fuel cells according to claim 1, wherein the polymer electrolyte ionomer solution of said (d)

is cast by heating the cathode catalyst layer at a temperature of about 45 to about 65° C. or by blocking a plurality of pores of the cathode catalyst with water, or by drying after tape-casting on a thick inert polymer film and putting the cathode on the tape-cast polymer electrolyte ionomer solution with the catalyst layer of the cathode facing the polymer electrolyte ionomer solution before said casting is completely dried.

11. The method of preparing Membrane-Electrode-Gasket Assembly used for polymer electrolyte fuel cells according to claim 1, wherein the step of attaching polytetrafluoroethylene gasket of 30 to about 400 μm in thickness by hot pressing to a portion of the polymer electrolyte layer is added between the steps of said (d) and said (e).

* * * * *